United States Patent [19]
Gaddis

[11] Patent Number: 5,314,340
[45] Date of Patent: May 24, 1994

[54] ELECTRONIC TEACHING APPARATUS HAVING TWO-PART PARTIALLY AND WHOLLY ACTUATED FOR INDICATION OF CORRECT AND INCORRECT ANSWERS

[75] Inventor: Ronald A. Gaddis, Lubbock, Tex.

[73] Assignee: Texas Instruments Incorporated, Dallas, Tex.

[21] Appl. No.: 605,909

[22] Filed: Oct. 30, 1990

[51] Int. Cl.⁵ .................................................. G09B 7/00
[52] U.S. Cl. ..................................... 434/327; 434/322
[58] Field of Search .............. 434/157, 236, 325, 333, 434/335, 343, 327, 322; 273/1 E, 85 G; 341/23, 34; 340/365 A

[56] References Cited

U.S. PATENT DOCUMENTS

| | | | |
|---|---|---|---|
| 4,051,608 | 10/1977 | Duncan | 434/344 |
| 4,085,523 | 4/1978 | Duncan | 434/201 |
| 4,303,398 | 12/1981 | Yoseloff | 434/335 |
| 4,636,977 | 1/1987 | Ikemoto et al. | 434/157 X |
| 4,681,548 | 7/1987 | Lemelson | 434/311 |
| 4,857,887 | 8/1989 | Iten | 341/34 |
| 4,978,302 | 12/1990 | Clossey | 434/335 X |
| 5,122,062 | 6/1992 | Cutler et al. | 434/327 |

Primary Examiner—Richard J. Apley
Assistant Examiner—Glenn E. Richman
Attorney, Agent, or Firm—William E. Hiller; Richard Donaldson; Jay M. Cantor

[57] ABSTRACT

An electronic learning device (10) uses keys (12a–d) which self-generate an electric signals responsive to a key being pressed. One signal drives the CORRECT segments (18b) of a display (18) and the other signal selectively drive the IN segments (18a) responsive to switching circuitry (16). Cards (14) provide a query and a plurality of possible answers, each possible answer associated with one of the keys (12a–d). A correct answer is encoded on the card.

20 Claims, 2 Drawing Sheets

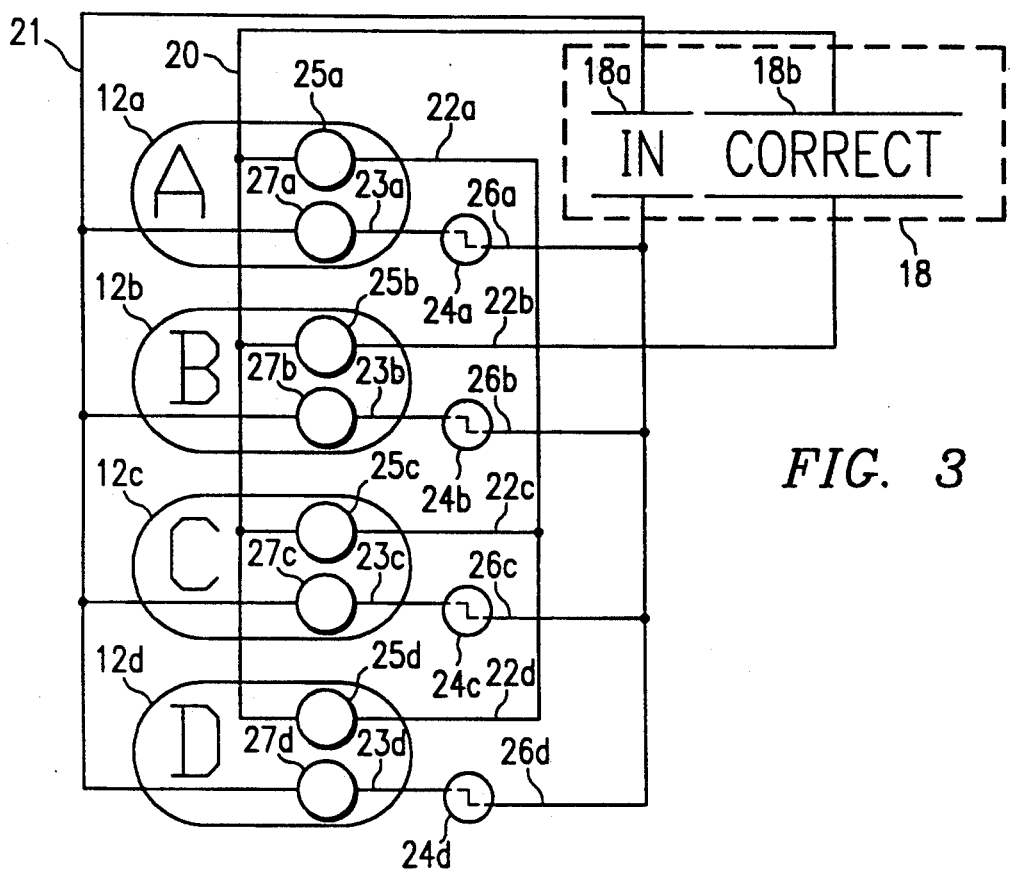
FIG. 3
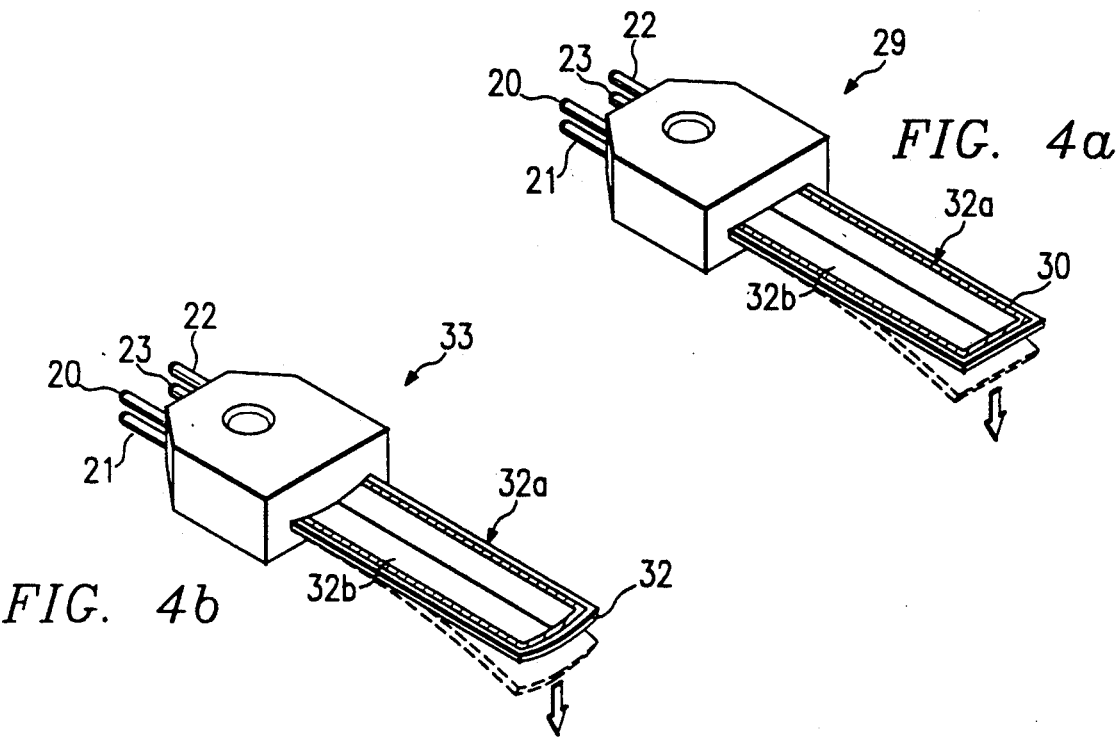
FIG. 4a
FIG. 4b

ELECTRONIC TEACHING APPARATUS HAVING TWO-PART PARTIALLY AND WHOLLY ACTUATED FOR INDICATION OF CORRECT AND INCORRECT ANSWERS

This application is related to U.S. patent application Ser. No. 605,897, filed Oct. 30, 1990 by Eugene E. Hollis, Jr. et al, entitled "Electronic Teaching Apparatus and Method", filed concurrently herewith.

TECHNICAL FIELD OF THE INVENTION

This invention relates in general to electronic circuits, and more particularly to an electronic teaching apparatus and method.

BACKGROUND OF THE INVENTION

Electronic teaching devices have greatly enhanced the learning capabilities of young children. A properly designed electronic teaching device provides excitement and visual rewards to a child and thus enhances the child's desire to learn. Further, most electronic teaching devices are portable, which allows children to use the devices in many settings.

One shortcoming of electronic teaching devices is their reliance on an electricity source. Typically, batteries are used in the electronic teaching devices. Batteries, however, eventually lose power and typically cannot be easily replaced by the child. Also, the cost of batteries over the life of the device may be substantial. Alternatively, the devices could be designed to connect to house current, but this would reduce the portability of the teaching devices and possibly endanger younger children.

Over the years, flash cards have proven to be an effective means of teaching children a variety of subjects, such as math, history and geography, among others. Conventional flash card systems, however, are electrically passive. Thus, they do not generate the enthusiasm for learning provided by electronic teaching devices. Existing electronic flash card systems provide the advantages of electronics, but require either batteries or an integral power supply plugged into the house current.

Therefore, a need has arisen for electronic teaching device which is self-powered.

SUMMARY OF THE INVENTION

In accordance with the present invention, an electronic teaching apparatus and method is provided which eliminates problems associated with prior such devices.

The electronic teaching apparatus of the present invention includes a medium for providing queries to a user. A keypad for receiving an answer to the query from the user comprises a plurality of keys, each key operable to generate first and second electrical signals responsive to being pressed. A first display is responsive to the first electrical signal from any of the keys and a second display is responsive to the second electrical signal from a key representing an incorrect answer.

The present invention provides technical advantages over the prior art. The first display may output a "correct" responsive to the first electrical signal from any of the keys and the second display may output a "in" responsive to the second electrical signal from a key representing an incorrect answer. Thus, if a key representing an incorrect answer is pressed, both the "in" and "correct" outputs will be displayed. The first and second electrical output signals may be generated by piezo electric voltage sources, and therefore, the apparatus may be used without an external power source such as batteries.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a schematic diagram of the switch circuitry of the present invention;

FIGS. 4a–b illustrate perspective views of flexure and snap-action piezo-film switches.

DETAILED DESCRIPTION OF THE INVENTION

The preferred embodiment of the present invention and its advantages are best understood by referring to FIGS. 1–5 of the drawings, like numerals being used for like and corresponding parts of the various drawings.

Figure 1:
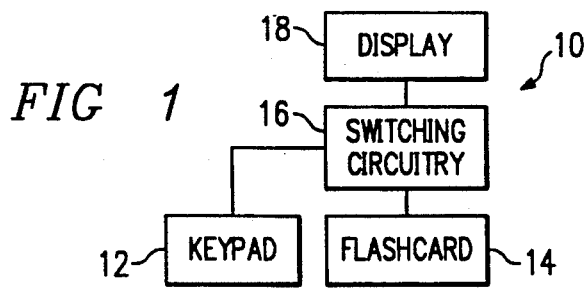
FIG. 1 illustrates block diagram of the present invention.

FIG. 1 illustrates a block diagram of the present invention. An electronic teaching device 10 comprises a keypad 12 and a flash card 14 both coupled to switching circuitry 16. Switching circuitry 16 is coupled to a display 18.

The keypad 12 comprises a plurality of keys. When the user presses one of the keys of the keypad 12, two electrical signals are generated from the pressing action. Suitable keys are described in greater detail in connection with FIGS. 4a–b.

Figure 2:
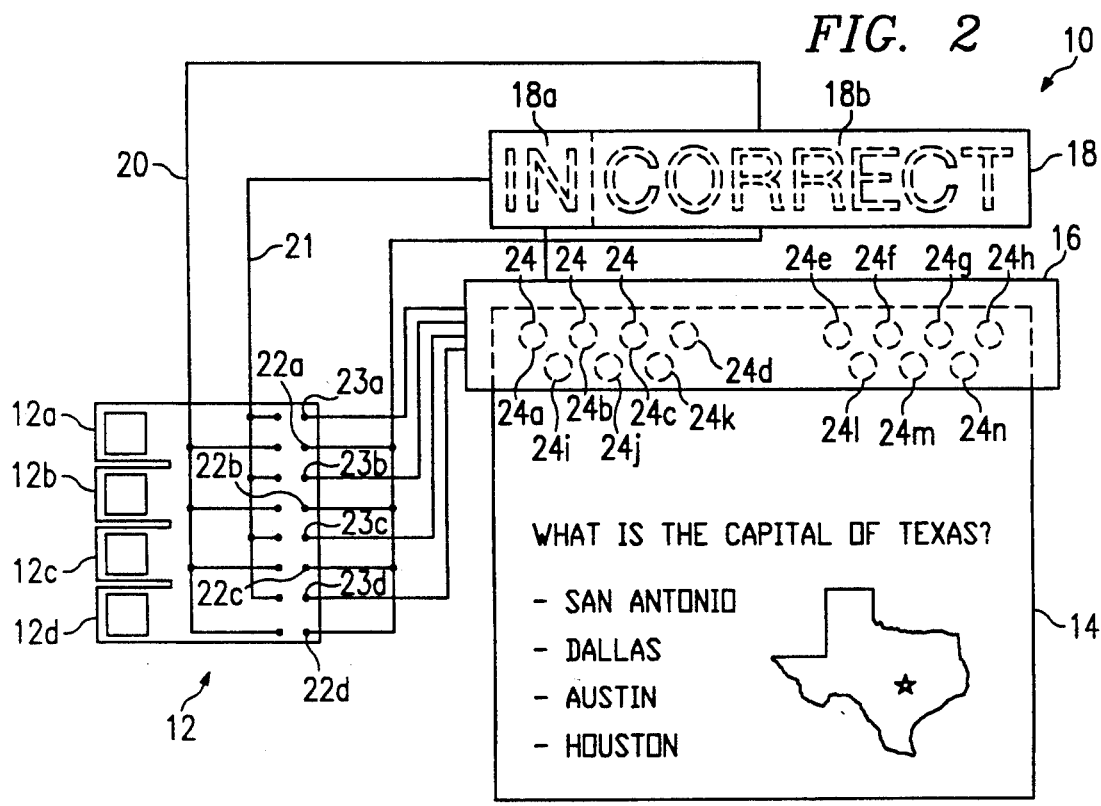
FIG. 2 illustrates a schematic diagram of the present invention.

The flash card 14, shown in greater detail in connection with FIG. 2, poses a query to the user. The correct answer is encoded on the flash card 14 such that switching circuitry 16 may determine whether the key pressed by the user indicates the correct response. The electrical signal generated by the pressed key drives a display 18, which provides a visual indication of whether the user's response is "correct" or "incorrect". Hence, the display 18 will be powered contemporaneously with the pressing of one of the keys of keypad 12. Once the electrical signals from the key subside, the display 18 will blank. In the preferred embodiment, the display 18 comprises an LCD display.

FIG. 2 illustrates a diagram of the main parts of the educational teaching device 10. In this FIGURE, four keys 12a–d comprise the keypad 12. Each key 12a–d has a first "common" output 20, each common output being connected to the "CORRECT" segments 18b of display 18, first voltage nodes 22a–d (referred to generally as voltage nodes 22) connected to the CORRECT segments 18b, second common nodes 21 connected to the "IN" segments 18a of the display 18 and second voltage nodes 23a–d (referred to generally as voltage nodes 23) connected to the switching circuitry 16. When a key is pressed, a voltage is developed between the voltage nodes 22 and 23 and common nodes 20 and 21 associated with the key. The voltage sources and the connection of the voltage nodes 23a–d to the switching circuitry 16 are shown in greater detail in connection with FIG. 3.

The cards 14 have the correct answer encoded in a portion of the card 14 that interfaces with the switching circuitry 16. As shown in FIG. 2, there are fourteen possible contact points 24a-n (generally referred to contact points 24) Of the fourteen contact points, four (one corresponding to each key 12a-d) are actually used in switching voltage from the keypad 12 to the display. The remaining ten contact points are used as camouflage to prevent the user from determining the answer from the enabled contact points. This aspect of the preferred embodiment is discussed in greater detail in connection with FIG. 3.

In the example of FIG. 2, the card 14 poses a query "What is the capital of Texas?" The four possible answers are "San Antonio" assigned to key 12a, "Dallas" assigned to key 12b, "Austin" assigned to key 12c, and "Houston" assigned to key 12d. For exemplary purposes, it is assumed that contact point 24a corresponds to key 12a, contact point 24b corresponds to key 12b, contact point 24c corresponds to key 12c, and contact point 24d corresponds to key 12d. Each time a key is pressed, the "CORRECT" portion 18b of the display 18 will be driven by the respective voltage node 22a-d. If a contact point 24a-d is "enabled", the "IN" portion of the display will be driven by the respective voltage node 23a-d. Thus, in the above example, contact points 24a, 24b and 24d would be enabled.

FIG. 3 illustrates the connections between the keypad 12, switching circuitry 16 and the display 18 in greater detail. The IN segments 18a of the display 18 are connected between the common nodes 21 and leads 26a-d, when enabled, contact points 24a-d couple voltage nodes 23a-d to respective leads 26a-d. The CORRECT segments 18b of the display 18 are connected between the common nodes 20 and the first voltage nodes 22a-d. Piezo film voltage sources 25a-d are connected between first common nodes 20 and first voltage nodes 22a-d. Piezo film voltage sources 27a-d are connected between common nodes 21 and second voltage nodes 23a-d. Piezo film voltage sources 25a-d and 27a-d each generate a voltage responsive to the respective key 12a-d being pressed.

When a contact point 24a-n on the card 14 is enabled, the respective lead 26a-d is electrically coupled to the voltage node 23a-d of the respective keys 12a-d. Hence, if contact point 24a is enabled, then lead 26a would be electrically coupled to node 23a. If contact point 24b were enabled, lead 26b would be coupled to node 23b. Using the example illustrated in FIG. 2, nodes 24a, 24b and 24d would be enabled to provide the correct responses. Hence, by pressing key 12a, voltage source 27a would generate a voltage at node 23a, which would be coupled to lead 26a, thereby driving the IN segments 18a. Also, a voltage on the CORRECT segments 18b would occur because of the voltages generated on voltage nodes 22a by voltage source 25a. Similarly, node 23b would be coupled to lead 26b, thereby resulting in a voltage on both the IN segments 18a and CORRECT segments 18b when key 12b was pressed. Node 23c would not be coupled to lead 26c (because contact point 24c is not enabled), thereby causing a voltage only on the CORRECT segments 18b when key 12c was pressed.

FIGS. 4a-b illustrate two embodiments of keys of keypad 12 used in the invention to generate a voltage when the keys are pressed. FIG. 4a illustrates a piezo film flexure switch 29 which may be used for the keys of keypad 12. The switch comprises a planar base 30, typically comprised of spring steel, and two pieces of metallized piezo film 32a-b adhered to the base 30. Piezo film 32a corresponds to one of the voltage sources of each key (for example, voltage source 25a) and piezo film 32b corresponds to the other voltage source (for example, voltage source 27a) of each key. The piezo film 32 typically comprises a polarized homopolymer of vinylidene fluoride (PVDF). This material (and complete switches) may be purchased from the Atochem Corporation (previously Pennwalt Corporation) of Valley Forge, Pa. A piezo electric material produces an electrical charge when deformed, and similarly, a voltage applied to the piezo electric material causes the material to elongate or contract, depending on the field's polarity. Hence, by pressing the key 29, the base 30 is elongated, thereby stretching the piezo material 32a-b. The deformation of the piezo material 32a results in a voltage generated across the output nodes 20 and 22 and deformation of piezo material 32b results in a voltage generated across output nodes 21 and 23. Hence, pressing a key generates two voltages. The output of the flexure switch 29 shown in FIG. 4a depends upon the rate of base 30 elongation. Thus, a slow pressing of the key 12 may result in a very low voltage output, which may be insufficient to drive the display 18.

FIG. 4b illustrates a snap-action switch 33. In this embodiment, the switch has a curved or creased base 34. When the switch 33 is pressed, the base 34 resists deformation until it can not long withstand the pressing force. At this threshold level, the base 34 "clicks." By varying the threshold of the base 34, a desired voltage may be produced which is optimal for driving the display 18.

Figure 5:
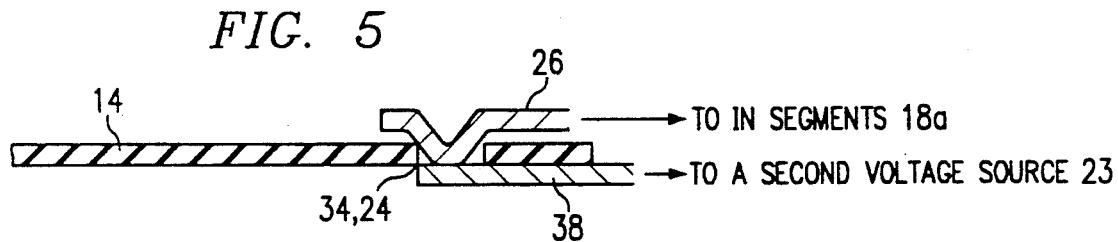
FIG. 5 illustrates a cross-sectional side view depicting the interaction between the flash card and the switch circuitry.

FIG. 5 illustrates an embodiment of the invention for connecting the voltage nodes 22a-e of the switches 12a-e to the display 18. In this embodiment, the contact points comprise holes 34 formed through the card 14. Where a hole is formed, the contact point is enabled; where a hole is not formed, the contact point is not enabled. Hence, in FIG. 5, contact point 24a is enabled. Leads 26a-d comprise metal contacts which fit into the holes 34 when a card 14 is inserted into the device 10. If a contact point is enabled (i.e., a hole is formed) the respective lead 26a-d will contact the respective voltage node 23a-d. If the contact point is not enabled (i.e., no hole is formed), the card 14 will act as a dielectric between node and the lead.

While the embodiment shown in FIG. 5 is one method of providing contact between the leads 26a-d and the second voltage nodes 23a-d, other methods could be used to selectively connect the voltage nodes to respective leads. For example, metal discs could be placed on the bottom of the cards 14 which would provide a bridge between the nodes and the leads.

The present invention provides significant advantages over the prior art. First, the present invention provides a self-powered teaching device with simplified circuitry to drive the display. Second, a dependable circuit is provided for receiving the card and decoding the correct answer therefrom.

Although the present invention and its advantages have been described in detail, it should be understood that various changes, substitutions and alterations can be made herein without departing from the spirit and scope of the invention as defined by the appended claims.

What is claimed is:

1. A portable electronic teaching apparatus comprising:

a medium for posing one of a question and a problem to a user for which a user response in the form of an answer is desired;

a keypad including a plurality of keys for receiving a response to said one of a question and a problem from the user as determined by the selective actuation by the user of at least one key of said plurality of keys;

means providing an electrical signal in response to the selective actuation of one of said keys by the user, the selective actuation of said one key by the user being indicative of a proposed answer to said one of a question and a problem; and a display operably associated with said keypad and responsive to the electrical signal resulting from the selective actuation of a particular key by the user for indicating the correctness of the response by the user, as determined by the selective actuation of the particular key by the user, to said one of a question and a problem as posed by said medium;

said display including first and second display portions arranged in separate display units disposed in proximity to each other, said first display portion being actuated and said second display portion being unactuated in response to the selective actuation of a particular key by the user corresponding to the correct response to said one of a question and a problem as posed by said medium for visually indicating on the display unit defining said first display portion only that the user response is correct, while the display unit defining said second display portion is blank, and both of said first and second display portions being actuated in response to the selective actuation of a particular key by the user corresponding to an incorrect response to said one of a question and a problem as posed by said medium for visually indicating on the combined display units defining said first and second display portions that the user response is incorrect.

2. An electronic teaching apparatus as set forth in claim 1, wherein said first display portion is operable to display the message "correct" when actuated, and said second display portion is operable to display the message "in" when actuated; and the actuation of both of said first and second display portions producing the composite displayed message "incorrect".

3. A portable electronic teaching apparatus comprising:

a medium for posing one of a question and a problem to a user for which a user response in the form of an answer is desired;

a keypad including a plurality of keys for receiving a response to said one of a question and a problem from the user as determined by the selective actuation by the user of at least one key of said plurality of keys;

means providing an electrical signal in response to the selective actuation of one of said keys by the user, the selective actuation of said one key by the user being indicative of a proposed answer to said one of a question and a problem;

each of said keys of said plurality of keys being structured to include said means providing an electrical signal so as to provide self-generation of an electrical signal therefrom independent of a separate power source in response to selective actuation by the user such that the electronic teaching apparatus is battery-free; and a display operably associated with said keypad and responsive to the electrical signal resulting from the selective actuation of a particular key by the user for indicating the correctness of the response by the user, as determined by the selective actuation of the particular key by the user, to said one of a question and a problem as posed by said medium;

said display including first and second display portions, said first display portion being actuated and said second display portion being unactuated in response to the selective actuation of a particular key by the user corresponding to the correct response to said one of a question and a problem as posed by said medium for visually indicating on said first display portion only that the user response is correct, and both of said first and second display portions being actuated in response to the selective actuation of a particular key by the user corresponding to an incorrect response to said one of a question and a problem as posed by said medium for visually indicating on the combined first and second display portions that the user response is incorrect.

4. An electronic teaching apparatus as set forth in claim 3, wherein said plurality of keys of said keypad comprise a plurality of piezo film switches.

5. An electronic teaching apparatus as set forth in claim 4, wherein said plurality of piezo film switches comprises a plurality of piezo film flexure switches.

6. An electronic teaching apparatus as set forth in claim 4, wherein said plurality of piezo film switches comprises a plurality of piezo film snap-action switches.

7. An electronic teaching apparatus as set forth in claim 3, wherein said display comprises a liquid crystal display.

8. An electronic teaching apparatus as set forth in claim 3, wherein said medium comprises a plurality of cards, each card posing one of a question and a problem to a user and a plurality of possible answers to said one of a question and a problem.

9. An electronic teaching apparatus as set forth in claim 8, wherein each of said cards has a machine readable code indicting the correct answer encoded thereon;

only one of said plurality of keys of said keypad being operably associated with said machine readable code indicating the correct answer on said card; and the selective actuation of said only one key by the user as a user response in the form of an answer being transmitted to said first display portion only for visually indicating on said first display portion only that the user response is correct.

10. A portable electronic teaching apparatus comprising:

a medium for posing one of a question and a problem to a user for which a user response in the form of an answer is desired;

a keypad including a plurality of keys for receiving a response to said one of a question and a problem from the user as determined by the selective actuation by the user of at least one key of said plurality of keys;

means providing an electrical signal in response to the selective actuation of one of said keys by the user, the selective actuation of said one key by the user being indicative of a proposed answer to said one of a question and a problem;

a display operably associated with said keypad and responsive to the electrical signal resulting from the selective actuation of a particular key by the user for indicating the correctness of the response by the user, as determined by the selective actuation of the particular key by the user, to said one of a question and a problem as posed by said medium;

said display including first and second display portions, said first display portion being actuated and said second display portion being unactuated in response to the selective actuation of a particular key by the user corresponding to the correct response to said one of a question and a problem as posed by said medium for visually indicating on said first display portion only that the user response is correct, and both of said first and second display portions being actuated in response to the selective actuation of a particular key by the user corresponding to an incorrect response to said one of a question and a problem as posed by said medium for visually indicating on the combined first and second display portions that the user response is incorrect;

each of said plurality of keys having a first key output conductor connected in common to said first display portion and a second key output conductor connected in common to said second display portion;

a set of first and second voltage nodes operably associated with each key of said plurality of keys, said first and second nodes being respectively connected to said first and second display portions;

a machine readable code provided on said medium and defined by the selective enablement of one set of first and second nodes corresponding to one of said plurality of keys;

said first and second voltage nodes being engaged by a key as selectively actuated by the user as a response in the form of an answer to said one of a question and a problem such that the selective actuation of any key provides voltage via said first voltage node to drive said first display portion; and a plurality of contact points respectively corresponding to said plurality of keys connected between said medium and said second display portion, all of said plurality of contact points corresponding to said plurality of keys being enabled except for a single contact point corresponding to the correct answer;

the selective actuation of one key of said plurality of keys by the user as a user response which corresponds to a non-enabled contact point producing a correct answer as a visual indication on said display by driving said first display portion while said second display portion remains inactive; and the selective actuation of any other key except for said one key of said plurality of keys by the user as a user response producing an incorrect answer as a visual indication on said display by driving said first and second display portions.

11. An electronic teaching apparatus as set forth in claim 10, wherein said medium comprises a plurality of cards, each card posing one of a question and a problem to a user and a plurality of possible answers to said one of a question and a problem, and each of said cards having a respective machine readable code indicating the correct answer encoded thereon.

12. An electronic teaching apparatus as set forth in claim 11, further including a card-receiving housing having a plurality of projection plugs disposed internally therein;

each of said cards of said plurality of cards being provided with a plurality of holes therethrough, said plurality of holes defining said contact points which are enabled;

said second key output conductors respectively having contact members therein;

the plurality of holes provided in each card being in selective registration with said contact members of said second key output conductors; and respective contact members of said second key output conductors being selectively received within holes provided in a card to connect said second voltage nodes corresponding thereto to said second display portion in response to the insertion of said card within said housing.

13. A battery-free electronic flash card device comprising:

a plurality of cards having indicia provided thereon, the indicia on each card posing one of a question and a problem and providing a plurality of possible answers from which the user is to select the correct answer, the said one of a question and a problem and said plurality of possible answers provided by the indicia appearing on each card differing from that on the other cards;

a plurality of piezo film switches normally disposed in open position and respectively corresponding to each of the plurality of possible answers provided by the indicia appearing on each card;

each of said plurality of piezo film switches being selectively operable so as to be disposed in closed position for providing a self-generated electrical signal therefrom independent of a separate power source in response to the selective actuation thereof by the user designating an answer from the user; and a display operably associated with each of said plurality of piezo film switches and a particular card of said plurality of cards on which the user is being tested, said display being responsive to the switch-generated electrical signal resulting from the selective actuation of a particular switch by the user disposing the switch in closed position for indicating the correctness of the designated answer from the user to said one of a question and a problem as provided by the indicia appearing on said particular card;

said display including first and second display portions, said first display portion being actuated and said second display portion being unactuated in response to the selective actuation of a particular piezo film switch by the user corresponding to the correct response to said one of a question and a problem appearing on said particular card for visually indicating on said first display portion only that the user response is correct, and both of said first and second display portions being actuated in response to the selective actuation of a particular piezo film switch by the user corresponding to an incorrect response to said one of a question and a problem appearing on said particular card for visually indicating on the combined first and second display portions that the user response is incorrect.

14. An electronic flash card device as set forth in claim 13, wherein said first display portion is operable to display the message "correct" when actuated, and said second display portion is operable to display the message "in" when actuated; and the actuation of both of said first and second display portions producing the composite displayed message "incorrect".

15. An electronic flash card device as set forth in claim 13, wherein said plurality of piezo film switches comprises a plurality of piezo film flexure switches.

16. An electronic flash card device as set forth in claim 13, wherein said plurality of piezo film switches comprises a plurality of piezo film snap-action switches.

17. An electronic flash card device as set forth in claim 13, wherein said display comprises a liquid crystal display.

18. An electronic flash card device as set forth in claim 13, wherein each of said cards has a machine readable code indicating the correct answer encoded thereon;

only one of said plurality of piezo film switches being operably associated with said machine readable code indicating the correct answer on said card; and the selective actuation of said only one piezo film switch by the user as a user response in the form of an answer being transmitted to said first display portion only for visually indicating on said first display portion only that the user response is correct.

19. An electronic flash card device as set forth in claim 13, wherein each of said plurality of piezo film switches has a first output conductor connected in common to said first display portion and a second output conductor connected in common to said second display portion;

a set of first and second voltage nodes operably associated with each piezo film switch of said plurality of piezo film switches, said first and second nodes being respectively connected to said first and second display portions;

a machine readable code provided on each card and defined by the selective enablement of one set of first and second nodes corresponding to one of said plurality of piezo film switches;

said first and second voltage nodes being engaged by a piezo film switch as selectively actuated by the user as a response in the form of an answer to said one of a question and a problem such that the selective actuation of any piezo film switch provides voltage via said first voltage node to drive said first display portion; and a plurality of contact points respectively corresponding to said plurality of piezo film switches connected between each card and said second display portion, all of said plurality of contact points corresponding to said plurality of piezo film switches being enabled except for a single contact point corresponding to the correct answer;

the selective actuation of one piezo film switch of said plurality of piezo film switches by the user as a user response which corresponds to a non-enabled contact point producing a correct answer as a visual indication on said display by driving said first display portion while said second display portion remains inactive; and the selective actuation of any other piezo film switch except for said one piezo film switch of said plurality of piezo film switches by the user as a user response producing an incorrect answer as a visual indication on said display by driving said first and second display portions.

20. An electronic flash card device as set forth in claim 19, further including a card-receiving housing having a plurality of projection plugs disposed internally therein;

each of said cards of said plurality of cards being provided with a plurality of holes therethrough, said plurality of holes defining said contact points which are enabled;

said second output conductors respectively having contact members therein;

the plurality of holes provided in each card being in selective registration with said contact members of said second output conductors; and respective contact members of said second output conductors being selectively received within holes provided in a card to connect said second voltage nodes corresponding thereto to said second display portion in response to the insertion of said card within said housing.

* * * * *